No. 777,824. PATENTED DEC. 20, 1904.
E. A. WHEELER.
TRACTION MOTOR.
APPLICATION FILED APR. 4, 1904.
NO MODEL. 3 SHEETS—SHEET 1.
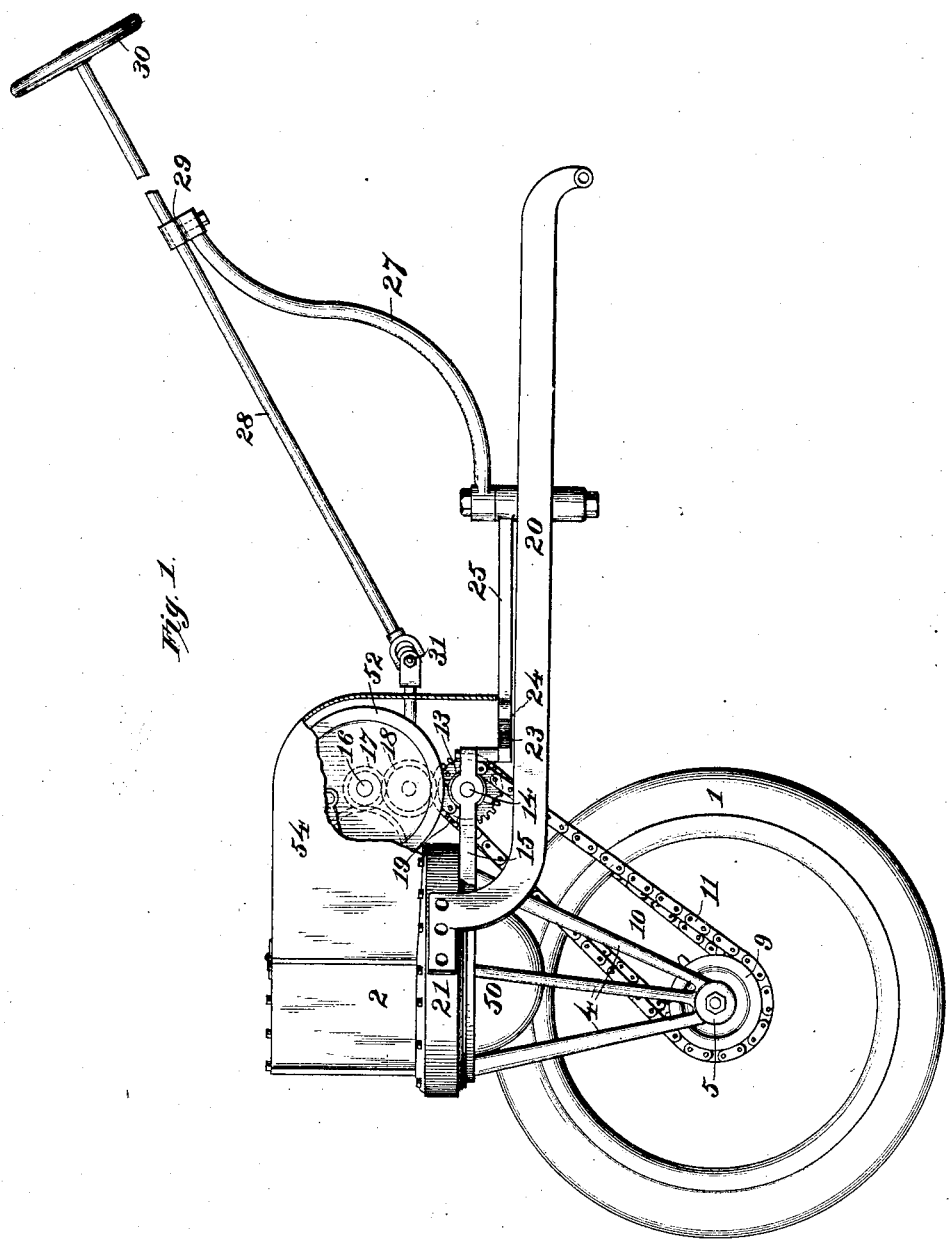
WITNESSES:
Paul A. Blair.
S. E. Ballinger
INVENTOR
Earl A. Wheeler
BY
Julian C. Dowell & Son
his ATTORNEYS.

No. 777,824. PATENTED DEC. 20, 1904.
E. A. WHEELER.
TRACTION MOTOR.
APPLICATION FILED APR. 4, 1904.
NO MODEL. 3 SHEETS—SHEET 2.
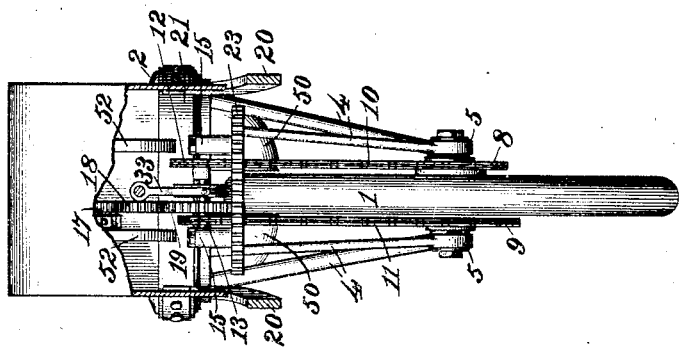
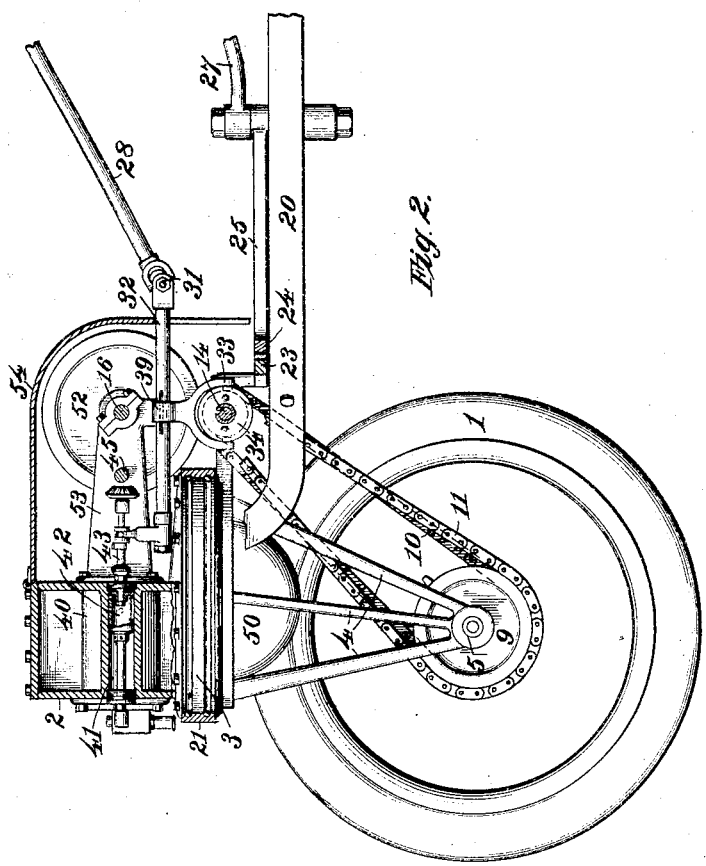
WITNESSES:
Paul A Blair.
S. E. Dallinger
INVENTOR
Earl A. Wheeler
BY
Julian C Dowell
his ATTORNEYS.

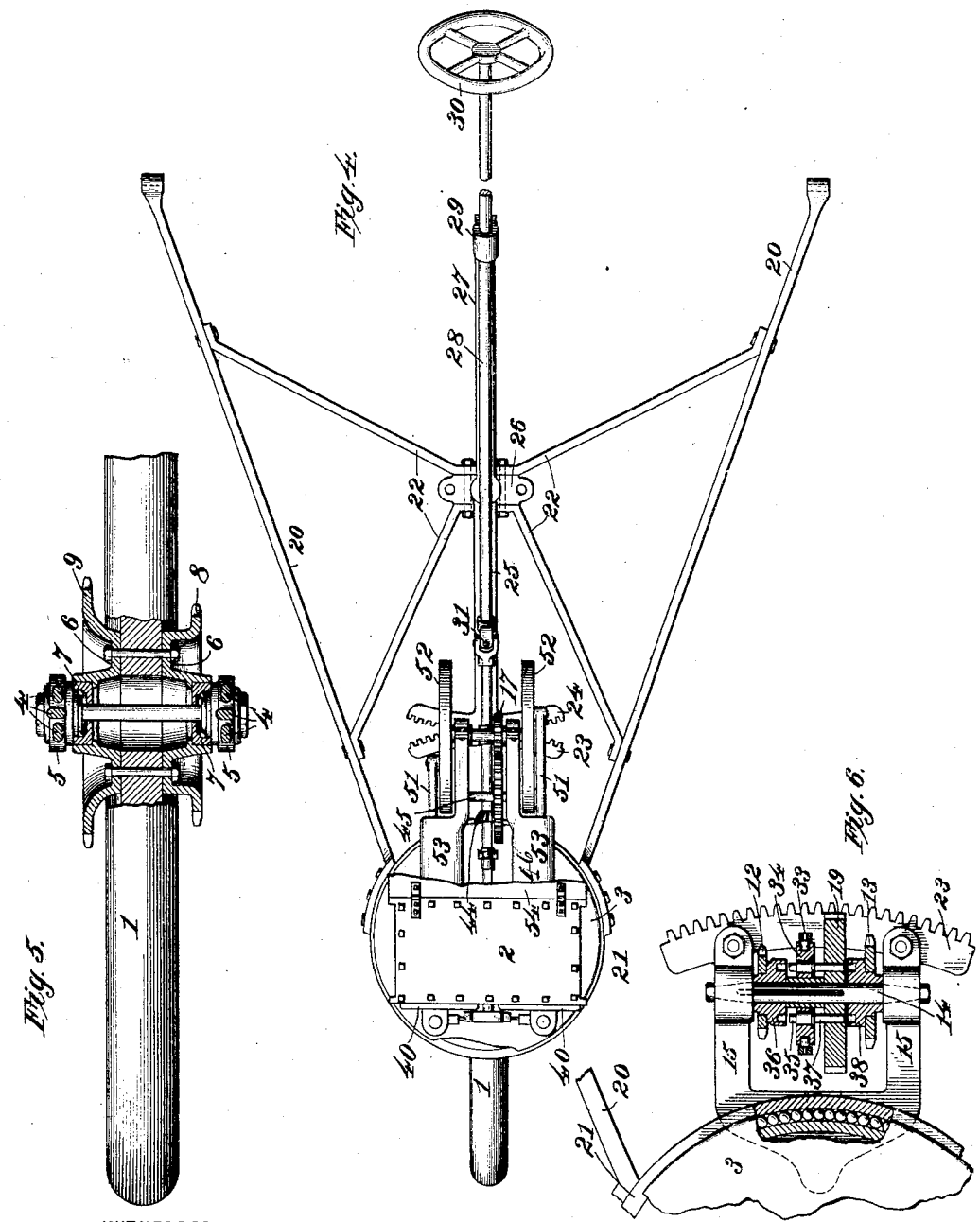

No. 777,824. Patented December 20, 1904.

UNITED STATES PATENT OFFICE.

EARL A. WHEELER, OF SHARON, PENNSYLVANIA.

TRACTION-MOTOR.

SPECIFICATION forming part of Letters Patent No. 777,824, dated December 20, 1904.

Application filed April 4, 1904. Serial No. 201,458.

*To all whom it may concern:*

Be it known that I, EARL A. WHEELER, a citizen of the United States, residing at Sharon, in the county of Mercer and State of Pennsylvania, have invented a certain new and useful Traction-Motor; and I do hereby declare the following to be a full, clear, and exact description of the invention, such as will enable others skilled in the art to which it appertains to make and use the same.

My invention consists of an improved locomotor, which I call an "iron horse," because it performs the work of a horse or, indeed, of a team of horses so far as power is concerned, though it does such work, to a greater degree, in a more satisfactory manner, with greater speed, better control, without the limits of strength and endurance to which an animal is subject, and without the expense and trouble incident to the maintenance and proper care of a real horse.

The machine consists of a mounted or wheeled motor, preferably a single wheel with a driving-motor therefor, which can be hitched to any ordinary vehicle, carriage, or wagon in the usual manner of hitching a horse, or which, if desired, can be equipped with suitable supporting-wheels for traveling alone.

This machine is very useful for pulling vehicles and wheeled bodies of all sorts with light or heavy loads. It has an important distinction and merit over ordinary motor-vehicles in that it is adapted for hitching to numerous wheeled bodies or detaching from one carriage and hitching to another. The advantage of having one small light motor applicable to various vehicles instead of a number of heavy and expensive separately-equipped motor-carriages will be readily appreciated. The invention has also an important military significance, for the machine will be found of great value, especially in warfare, for drawing field guns or cannon, caissons or field-carriages, and other implements and vehicles of war. When used in battle, it has the great advantage of taking the place of a team of horses for carrying a gun quickly into action and can travel even more easily than a team over fields and rough roads, while it is more easily managed and is not subject to disablement by the injury of slaying of one horse. It would be out of the question for any government to go to the enormous expense of providing separate motor-equipped mounted artillery-pieces, and even were such expense practical it would not be feasible to construct a motor-driven cannon of sufficient lightness which would withstand the shocks of firing and strain of service; but it is a simple matter to hitch the iron horse to a gun, carry it quickly into action, and return for transporting another ordnance-piece. The machine will thus be found an important factor in mobilization of artillery in war.

The main objects of the invention in addition to producing a practicable and efficient machine of the above-noted character are to attain great simplicity, lightness, and compactness of construction and to provide efficient variable-speed gear and steering mechanism therefor.

In the accompanying drawings, which are to be taken as a part of this specification, I have represented an exceedingly-efficient machine embodying my invention, which, however, will be understood to be capable of other embodiments and susceptible of various modifications. Without limiting myself, therefore, to the particular construction shown, the following description of the illustrated machine will serve to set forth fully the invention, which will then be recited particularly in the annexed claims.

In said drawings, Figure 1 is a side elevation of the machine with a part of the casing inclosing the engine-shaft and transmission-gearing broken away. Fig. 2 is a similar view, omitting parts of the draft-frame and with parts broken away and the engine illustrated principally in central longitudinal section. Fig. 3 is a back view of the wheel and motor. Fig. 4 is a top plan view of the whole machine. Fig. 5 is a central longitudinal section of the wheel-hub. Fig. 6 is a fragmentary view showing in central longitudinal section the variable-speed mechanism.

The numeral 1 denotes the wheel, upon which is mounted an engine or motor 2 directly over the center of the wheel. This engine, with its appurtenances, should be of such construction and arrangement that its weight is practically counterbalanced at opposite sides of the wheel as well as at opposite sides of the wheel-axle. The base 3 of the engine is supported by arms or standards 4, three of which are shown at each side of the wheel, having their lower ends converging and joined to suitable bearings 5, mounted on the wheel-axle. Any strong wheel of appropriate construction may be used. The wheel illustrated is, however, admirably adapted for the present machine and its construction is deemed important. It will be observed in Fig. 5 that the inner ends of the spokes are bolted between two annular hub members or rings 6, which clamp the spokes rigidly between them. These rings constitute together the hub, which has a ball-bearing on the wheel-axle, each ring having an inner flange or sleeve in the end of which is secured a cup 7, coacting with a bearing-cone on the axle and having antifriction-balls suitably arranged between them. Each ring 6 has also an outer flange formed or provided with a sprocket, 8 and 9. The two sprockets 8 and 9 of the wheel-hub are of different sizes and are connected by sprocket-chains 10 and 11 with variable-speed gears or sprockets 12 and 13, loosely mounted on a power-transmission shaft 14. Either one of said sprockets 12 or 13 can be clutched with the transmission-shaft, as hereinafter explained, for operatively connecting the engine with the wheel. The transmission-shaft 14 is shown mounted in bearings or brackets 15, rigidly attached to the engine-base, and is shown geared to the engine-shaft 16 by gears 17 18 19. It is obvious that more than two sprockets could be provided on the wheel-hub for connection with other speed gears or sprockets on the transmission-shaft.

The locomotor or engine driven wheel is adapted for attachment to a vehicle, cannon, mounted machine, or other wheeled body by means of shafts 20, the front ends of which are shown joined to a ring 21, surrounding the engine-base 3, while their rear ends are designed for attachment to the front axle of the vehicle to be drawn. Thus will be seen the resemblance of attaching this iron horse to the hitching of a real horse to a vehicle. Obviously by equipping the shafts with suitable supporting-wheels the machine would be adapted for traveling alone. The shafts 20, together with suitable cross-braces 22, form a strong and rigid draft-frame.

It is desirable that the engine and wheel, together with the transmission mechanism, should be capable of turning together either to the right or left for the purpose of steering the machine, for which purpose the engine is pivotally connected to the shafts or frame. This is accomplished in the present instance by making the base 3 of the engine circular and fitting it rotatably within the ring 21, to which the shafts 20 are rigidly attached. An antifriction-bearing is preferably provided between this circular base and ring, as shown in Figs. 2 and 6, where antifriction-balls appear fitted in confronting annular grooves in the said parts.

The steering mechanism of the illustrated machine is exceedingly simple and efficient. It comprises coacting segment-racks 23 and 24, the former of which is rigidly attached to the engine-base, as by the brackets 15, while the latter is carried by a longitudinally-disposed arm or lever 25, fulcrumed to a support 26, formed at the central junction of the cross-braces 22. The pivot of the arm 24 is connected by a rod 27 with a controlling-rod and steering-lever 28, by means of which the driver can steer the locomotor as desired. It will be observed that to turn the wheel either to the right or left the driver simply has to move the rod or steering-lever 28 in the same direction to which the machine is to be guided. The rod 27 serves not only to connect the lever 25 with the controlling-rod 28, but also to support the same. To permit the proper swinging movements of the two rods for steering the machine, said controlling-rod 28 is shown connected to its supporting-rod 27 by a swivel collar or coupling 29, in which the controlling-rod is also permitted sliding and rotatable movements for purposes hereinafter appearing. The controlling-rod is shown provided with a hand-wheel 30 for turning it.

The power-transmission and variable-speed gear will now be described.

As before noted, the engine-shaft 16 is geared by spurs 17, 18, and 19 with the transmission-shaft 14, on which are loosely mounted the low and high speed gears or sprockets 12 and 13. The controlling-rod 28, which is shown inclined, is connected at its front end by a universal joint 31 to a horizontal longitudinally-disposed rod 32. To this rod 32 is attached a yoke 33, the yoke-arms of which have teats engaging a grooved clutch-throw 34, slidable on the transmission-shaft, so that on turning said rod 32 by means of the hand-wheel 30 the yoke is rocked to slide the clutch-throw to the right or left, (see Figs. 2 and 6,) according to the direction in which the hand-wheel is turned. Either one of the sprockets 12 or 13 can be clutched with the transmission-shaft to throw the engine in gear with the wheel at low or high speed by moving the clutch-throw into engagement with the desired sprocket. In the present case said clutch-throw has at one side projecting pins 35, adapted to engage holes in the low-speed sprocket 12 or in a collar 36 rigid therewith, while at the opposite side said clutch-throw has pins 37, shown slidably extended through openings in gear 19, adapted to engage holes in the high-speed sprocket 13 or in a collar 38 rigid therewith. Hence accordingly as the driver turns the hand-wheel 30 to swing the yoke 33 to the right or left the engine will be connected operatively with the wheel 1 by the low-speed or high-speed gearing. The engine can be thrown out of gear with the wheel simply by moving the clutch-throw to an intermediate position, as shown in Fig. 6, out of engagement with either sprocket. The yoke 33 is attached to the rod 32, so as to swing or turn therewith, but also so as to permit an independent sliding or longitudinal movement of the rod for the purpose of shifting the valve-rod of the engine, which is described later. This is effected in this instance by means of a pin or pins in the head 39 of the yoke engaging in a slot or slots in the rod, as apparent from Fig. 2.

The motor or engine, which has been designated as a whole by the numeral 2, may be of any suitable type; but from the nature of this machine it is obvious that the smallest and lightest attainable motor having the requisite efficiency and power is desirable. A type of engine especially valuable by reason of its great simplicity and compactness and enormous comparative efficiency is that known as "Trimotor," invented by William Heckert, of Findlay, Ohio. One form of this engine is shown and described in Heckert's United States Patent No. 708,637, dated September 9, 1902, another form in his Patent No. 764,808, of July 12, 1904, improved forms in his pending applications for patents, and the engine here represented is a further improvement thereon, also the invention of Heckert, who has designed it principally for machines of the present character where lightness, compactness, and great power are all-important desiderata. This engine, which is of the two-cylinder type, need not be specifically illustrated nor described herein except by a brief reference to its principal features. The two engine-cylinders 40 are arranged over opposite sides of the wheel, with an intermediate steam-chamber 41, from which steam is admitted alternately to the two cylinders by a rotary valve 42, having ports registering at proper intervals with ports in the cylinders. The valve 42 is connected to rotate with a shaft 43, geared by bevel-pinions 44 with a shaft 45, on which is a gear 46, meshing with gear 17 on the engine-shaft and twice the size of the latter gear, so that the valve rotates once to every two rotations of the engine-shaft. As well known by all familiar with Heckert's engines, the pistons within the cylinders are actuated by explosion of combustible gases at one side and steam at the opposite side, the hot exhaust-gases from the gas side of the engine serving to heat the water for formation of steam. Water may be supplied from a suitable tank or from two tanks 50, depending from the engine-base at each side of the wheel. The exhaust-gases go through flues in annular water-spaces around the cylinders, thence in a circuitous passage through the feed-water. Steam thus generated accumulates in the steam-dome, whence it is alternately supplied to the steam sides of the two pistons by the valve 42, as aforesaid. The great advantages of an engine of this type in the present machine is the great efficiency attained by a combination of gas and steam power and compactness resulting from dispensation of the usual water-boiler and separate furnace. The engine-pistons are connected by connecting-rods 51 to crank-wheels 52, the shaft 16 of which is mounted in bearings on brackets 53, extending from the engine-casing and rigid therewith. The bearings of the shaft 45 are also mounted on these brackets. A casing 54, covering the crank-wheels and transmission-gearing, is shown hinged to the rear of the engine-casing, so that it can be swung up for access of this mechanism. Further exposition of the engine is deemed unnecessary, since, as aforesaid, any motor of suitable compactness and power may be adopted.

I claim as my invention and desire to secure by Letters Patent of the United States—

1. A locomotor comprising, in combination, a motor-driven wheel, shafts adapted for attachment to a vehicle or body to be conveyed and having a pivotal connection with said motor-driven wheel permitting the latter to turn to the right or left, and steering mechanism comprising coacting segment-racks, one connected to the motor-driven wheel, and the other carried by a horizontally-vibratory lever.

2. A locomotor comprising, in combination, a horizontal circular base mounted on a wheel, a motor mounted on said base and connected with said wheel for driving it, a ring in which said base is rotatably secured, shafts attached to said ring and adapted for attachment to a vehicle or body to be conveyed, coacting segmental racks, one of which is rigid with the ring, a horizontally-vibratory lever having its pivot supported between the shafts, and carrying at its swinging end the other rack, and a backwardly-projecting steering-lever connected with said first-mentioned lever.

3. A locomotor comprising, in combination, a wheel-supported motor, the motor being connected to the wheel for driving it, a draft-frame in which said motor has a pivotal bearing, a horizontally-movable steering-lever pivoted in said frame, connections therewith for steering the lever, an inclined motor-controlling rod, and an inclined supporting and connecting rod rigid with the pivot of said lever and having a sliding swivel connection with said controlling-rod.

4. A locomotor having, in combination, a wheel-supported traveling motor, a frame attached thereto with respect to which the mounted motor is capable of turning as a whole about a vertical axis, variable-speed mechanism, steering mechanism, and a pivoted and rotatable controlling-rod connected to both mechanisms and adapted to be moved to the right or left for steering the machine and to be turned for operating said variable-speed mechanism.

5. A locomotor having, in combination, a wheel-supported traveling motor, a frame attached thereto in which said mounted motor can turn about a vertical axis, and steering mechanism comprising coacting segment-racks, one of which is rigid with the mounted motor, and a horizontally-vibrating lever which carries the other segment-rack.

6. A locomotor having, in combination, a wheel-supported traveling motor, a frame attached thereto in which said mounted motor can turn about a vertical axis, and steering mechanism comprising coacting segment-racks, one of which is rigid with the mounted motor, and a horizontally-vibrating lever which carries the other segment-rack, and a hand-lever connected to the pivoted end of said rack-carrying lever, whereby steering is effected by moving the lever in the direction of a desired turn.

7. In combination with a wheel-supported motor, a power-shaft, different-speed gears loosely mounted thereon and connected with the running-gear, an intermediate clutch-collar rotatable with and slidable on said shaft, pins on opposite sides of said clutch-collar, and holes in said gears in which said pins are adapted to engage when the clutch-collar is moved to the right or left.

8. In combination with a wheel-supported motor, a power-shaft, different-speed gears loosely mounted thereon and connected with the running-gear, an intermediate clutch-collar rotatable with and slidable on said shaft, a rotatory rod, a yoke carried thereby adapted to swing when the rod is turned, said yoke engaging the clutch-collar, and means for engaging said clutch-collar with either gear when it is moved toward that gear by the yoke.

9. A locomotor comprising, in combination, a wheel, a motor mounted on the wheel-axle, a power-shaft driven by the motor, variable-speed gearing between said shaft and wheel, sprockets on opposite sides of the wheel-hub, variable-speed sprockets on said shaft, connecting sprocket-chains one set of said sprockets being loosely mounted, and means for clutching either of the loose sprockets with its rotating part.

10. A locomotor comprising, in combination, a wheel, a motor mounted on the wheel-axle, a power-shaft driven by the motor, variable-speed gearing between said shaft and wheel, sprockets on opposite sides of the wheel-hub, variable-speed sprockets loosely mounted on said shaft, connecting sprocket-chains, and means for clutching either of said speed-sprockets with said shaft.

11. A locomotor comprising, in combination, a wheel, a motor mounted on the wheel-axle, a frame with respect to which said motor and wheel can turn as a whole about a vertical axis, steering mechanism, a power-shaft mounted in fixed relation to the wheel and motor and driven by the latter, sprockets on opposite sides of the wheel-hub, corresponding variable-speed sprockets loosely mounted on said shaft, connecting sprocket-chains, and means for clutching either of said loose sprockets with said shaft.

12. A locomotor comprising, in combination, a frame, a wheel-supported traveling motor pivotally mounted therein, brackets rigid with the motor-casing, a horizontal segment carried by said brackets, a horizontally-vibrating steering-lever, a segment-rack carried thereby coacting with the other rack, a power-shaft mounted in bearings on said brackets and driven by the motor, and transmission-gear between said shaft and the wheel.

13. A locomotor comprising, in combination, a frame, a wheel-supported traveling motor pivotally mounted therein, brackets rigid with the motor-casing, a horizontal segment carried by said brackets, a horizontally-vibrating steering-lever, a segment-rack carried thereby coacting with the other rack, a power-shaft mounted in bearings on said brackets and driven by the motor, variable-speed gears loosely mounted on said shaft and connected to the wheel, and means for clutching either of said gears with said shaft.

14. In a motor-driven vehicle, the combination with a frame, of a supporting and guiding wheel having a pivotal axle, and steering mechanism comprising coacting segment-racks, one of which is connected to the wheel-axle, and a lever carrying the other rack.

15. A locomotor having, in combination, a frame, a motor-driven supporting and guiding wheel, a power-transmission shaft supported to turn angularly with the wheel, gearing between said shaft and wheel, a segment-rack also supported to turn angularly with the wheel, a horizontally-vibratory lever carrying a coacting segment-rack, a rotatory rod, means connected therewith for operatively connecting said transmission-gearing on turning of said rod, an inclined controlling-rod coupled to the former rod by a universal joint, and a rod connected to the fulcrumed end of said lever and connected to said controlling-rod by a swivel-joint also permitting rotation and sliding of said controlling-rod.

16. A locomotor having, in combination, a frame, a motor-driven supporting and guiding wheel, steering mechanism therefor comprising coacting segment-racks, one of which is rigid with the wheel-mounting, a horizontally-vibratory lever carrying the other rack, a transverse power-transmission shaft supported to turn angularly with the wheel, variable-speed gears loosely mounted thereon and connected with the wheel, an intermediate clutch-throw adapted to clutch either gear with said shaft, a longitudinal rotatory rod, a yoke attached thereto and to said clutch-throw for shifting the latter when said rod is turned, a rotatory controlling-rod coupled to said former rod by a universal joint, and a connecting and supporting rod rigid with the fulcrumed end of said lever having a swivel, slidable and pivotal connection to said controlling-rod.

17. In a motor-driven vehicle, the combination with the frame, running-gear and motor, of power-transmission mechanism, a rotatory rod for operatively connecting said mechanism, an inclined rotatory controlling-rod connected thereto by a universal joint, steering mechanism including a vibratory lever, and a connecting-rod rigid with said lever and connected to the said controlling-rod by a swivel and sliding joint also permitting said controlling-rod to turn.

18. In combination with a motor, a power-transmission shaft, a transmission-gear thereon, a shiftable clutch-collar for operatively connecting said gear with the motor, a transverse rotatory rod, a yoke attached thereto and engaging said clutch-collar for shifting it by turning of said rod, said rod being also longitudinally movable, and starting and stopping mechanism operated by longitudinal movement of said rod.

19. A machine of the character described comprising, in combination, a wheel, a circular member above the wheel supported by standards mounted on the wheel-axle, a ring in which said member has a pivotal bearing, a draft-frame or shafts rigidly attached to said ring, a motor mounted on said member, power-transmission mechanism between said motor and wheel, steering mechanism, a rotatory and shiftable controlling-rod and lever connected to said mechanisms, means for operatively connecting said power-transmission mechanism by turning of said rod, and means for operating said steering mechanism by shifting said rod.

In testimony whereof I affix my signature in presence of two witnesses.

EARL A. WHEELER.

Witnesses:
E. W. FORGY,
W. S. TAYLOR.